United States Patent

[11] 3,607,956

| [72] | Inventors | Lothar Hornig;<br>Horst Grosspietsch; Gunter Mau, all of<br>Frankfurt am Main, Germany |
|---|---|---|
| [21] | Appl. No. | 20,876 |
| [22] | Filed | Mar. 27, 1970 |
| [45] | Patented | Sept. 21, 1971 |
| [73] | Assignee | Farbwerke Hoechst Aktiengesellschaft<br>vormals Meister, Lucius & Bruning<br>Frankfurt am Main, Germany |
| [32] | Priority | Sept. 23, 1966 |
| [33] | | Germany |
| [31] | | F50273 |
| | | Continuation of application Ser. No.<br>667,640, Sept. 14, 1967, now abandoned. |

[54] PROCESS FOR PREPARING ALLYL CHLORIDE AND METHALLYL CHLORIDE
10 Claims, No Drawings

[52] U.S. Cl. .................................................. 260/654 A,
260/654 D
[51] Int. Cl. ........................................................ C07c 21/04

[50] Field of Search ............................................. 260/654 A,
654 D; 252/440

[56] References Cited
UNITED STATES PATENTS

| 2,328,275 | 8/1943 | Heard ........................... | 252/429 (X) |
| 2,270,165 | 1/1942 | Groll et al. ...................... | 252/440 (X) |
| 3,363,010 | 1/1968 | Schwarzenbek .............. | 260/654 A (X) |

FOREIGN PATENTS

| 1,437,129 | 3/1966 | France ........................ | 260/654 A |

*Primary Examiner*—Bernard Helfin
*Assistant Examiner*—Joseph A. Boska
*Attorney*—Curtis, Morris & Safford

ABSTRACT: Preparation of allyl chloride or methallyl chloride by reaction of oxygen with (a) propylene or isobutylene and hydrogen chloride or (b) a monochloropropane or monochlorisobutane in the presence of a catalyst containing (1) tellurium and/or compounds thereof, (2) basic nitrogen compounds or salts thereof and (3) vanadium, molybdenum or tungsten or compounds thereof.

PROCESS FOR PREPARING ALLYL CHLORIDE AND METHALLYL CHLORIDE

This application is a continuation of Ser. No. 667,640, filed Sept. 14, 1967 now abandoned.

The present invention provides a process for preparing allyl chloride and methallyl chloride.

It is known that allyl chloride and methyl-substituted allyl chloride can be prepared by passing oxygen (a) mixtures of olefins having 3 or 4 carbon atoms and hydrogen chloride or (b) monochloroparaffins having 3 or 4 carbon atoms, or (c) mixtures of (a) and (b) over catalysts containing elementary tellurium and/or tellurium compounds. It has also been proposed to increase the space-time yields obtained according to a known process by using mixed catalysts containing, in addition to tellurium and/or tellurium compounds, at least one basic nitrogen compound or the salt thereof (cf. French Patent No. 1,484,142). The reaction is advantageously carried out in the presence of catalysts supported on carrier material as a fixed bed catalyst, especially a fluid bed catalyst and a fluidized bed catalyst (cf. French Patent No. 1,487,635).

In the known process as in other oxidation processes and, in particular, oxychlorination processes, solids that are rich in carbon, deposit on the catalyst owing to side reactions. These deposits are practically of no importance as regards the yields to be obtained, but they weaken the activity of the catalyst and, thus, gradually reduce their space-time yields.

We have now found a process for preparing allyl chloride or methallyl chloride, by reacting oxygen with (a) mixtures of propylene or isobutylene and hydrogen chloride and/or (b) monochloropropane, preferably isopropyl chloride, or monochloroisobutane, preferably tert.-butyl chloride, in the presence of catalysts containing elementary tellurium and/or tellurium compounds, a process which comprises catalysts having, in addition, at least one basic nitrogen compound or the salt thereof, at least one transition metal capable of forming heteropoly acids, or the compounds thereof and, if desired, an oxygen-containing acid of phosphorus and/or sulfur or the salt thereof.

It is surprising that the process of the invention prevents, to a large extent, the above-mentioned solids that are rich in carbon, from depositing on the catalyst, thus maintaining the space-time yield constant over a prolonged period of time.

It is convenient to support the catalyst on inert carrier materials, for example aluminum oxide, aluminum silicate, silicic acid, silica gel, feldspar, pumice or asbestos.

The catalyst is advantageously prepared from tellurium metal and/or tellurium compounds which are easily accessible in industry, for example tellurium-IV chloride, tellurium-IV oxide and telluric acid. It is however, also possible to prepare the catalyst from other tellurium compounds, for example tellurium-II oxide, tellurium-II chloride, tellurium-IV oxychloride, hydrogen telluride, tellurous acid, metatelluric acid, tellurites, tellurates, metatellurates, hexachlorotellurates, tellurium-IV oxysulfate, basic tellurium-IV orthophosphate as well as organic tellurium compounds, such as alkyl- and dialkyl tellurides, alkyl-tellurium trichlorides, dialkyl tellurium dichlorides.

Salts of basic nitrogen compounds suitable for preparing the catalyst are, for example, ammonium salts and ammonium salts substituted by hydrocarbon radicals.

There are used, for example, a. mono-, di-, tri- and tetra-alkyl ammonium salts having identical or different alkyl groups, such as methyl-, dimethyl-, trimethyl-, tetramethyl-, tri-isopropyl-, methyl-ethyl-, stearyl-, methyl-butyl-dodecyl ammonium salts;

b. aryl-ammonium salts, such as anilinium salts; mono-, di- and trialkyl-monoaryl ammonium salts, such as N-methyl-, N.N-dimethyl- and N.N.N.-trimethyl anilinium salts;

c. ammonium salts of aza-cycloaliphatic compounds, such as pyrrolidinium and piperidinium salts and the N-mono- and N.N-dialkyl derivatives thereof as well as, for example, bis-1.5-pentamethylene ammonium salts $[(CH_2)_5N(CH_2)_5]^+X^1$;

d. the salts of heterocyclic nitrogen bases of aromatic character, such as pyridinium-, quinolinium-, isoquinolinium salts and the alkyl derivatives thereof, for example N-methyl-pyridinium- or picolinium-, lutidinium- and collidinium salt.

In addition to the mono-ammonium salts, there may also be used the salts of poly-amines:

e. alkylene-diammonium salts, such as ethylene-diammonium-, hexamethylene-diammonium-, and phenylene-diammonium salts. Ammonium salts containing OH groups may also be used:

f. mono-, di- and trialkanol-ammonium salts, such as ethanol-, di-ethanol- and triethanol-ammonium salts.

Preferred ammonium salts are hydrochlorides, among which, in group (a) especially ammonium chlorides substituted by 1 to 4 methyl groups and ammonium chlorides substituted by 4 alkyl groups, in group (b) anilinium chloride and anilinium chlorides substituted by one or several methyl groups at the nitrogen atom and/or in the phenyl nucleus and in group (d) pyridinium chloride and the pyridinium chlorides substituted by one or several methyl groups at the nitrogen atom and/or in the aromatic nucleus.

In addition to ammonium salts, the amines from which they are derived or the corresponding ammonium hydroxides may also be used.

Moreover, the catalyst can be prepared not only from the chlorides but also from other ammonium salts which may be substituted by hydrocarbon radicals, for example the salts of nonmetals which may contain oxygen and which correspond to the empirical formula $H_nX_mO_p$ in which $n$ is an integer of from 1 to 4, $m$ is an integer of from 1 to 4, $p$ is zero or an integer of from 1 to 8, and X represent F, Cl, Br, I, S, Se, N, P or C, such as halides, chalcogenides, sulfites, sulfates, nitrates, phosphates and carbonates. Among the salts of polybasic acids there may be used acid or neutral salts.

Finally, it is also possible to prepare the mixed catalysts from the corresponding ammonium salts of organic acids, such as acetates and oxalates.

Transition metals capable of forming heteropoly acids and suitable for the preparation of the catalysts, are vanadium molybdenum and tungsten (cf. G. Jander and H. Wendt, Lehrbuch fuer das anorganisch-chemische Praktikum, Hirzel Verlag, Leipzig, 1948, pages 399 and 400). Although the free metals are generally appropriate, they are used, in most cases, in the form of their easily accessible compounds.

Suitable vanadium compounds are vanadium pentoxide, vanadium-IV oxychloride and vanadium-IV oxysulfate, furthermore vanadium-II oxide, vanadium-II chloride and vanadium-II sulfate, vanadium-III oxide, vanadium-III chloride and vanadium-III sulfate, vanadium-IV oxide and vanadium-IV sulfate, vanadium-V oxychloride, as well as the peroxy compounds of pentavalent vanadium, vanadium sulfides, sulfato-, sulfito- and oxalato- vanadates of tri-, tetra- and pentavalent vanadium, vanadic acids and the salts thereof, such as mono-, di-, tri-, tetra- and pentavanadates of pentavalent vanadium and heteropoly acids containing vanadium, as well as the salts thereof.

Molybdenum- and tungsten compounds suitable for the preparation of the catalyst are, for example, the oxides of tetra- and hexavalent metals as well as the known mixed oxides, i.e. tungsten- and molybdenum blue; Furthermore, di- and tri-sulfides of both metals, tungstates and molybdates as well as peroxy-tungstates and peroxy-molybdates, and thio-molybdates. Even polymolybdates and polytungstates are appropriate starting compounds and so are the iso- and hetero-polyacids of molybdenic acid and tungstic acid and the salts thereof.

Suitable oxygen-containing acids of phosphorus are especially ortho-, meta- and pyrophosphoric acid, peroxy phosphoric acid and acids in which phosphorus has a formal valency less than 5, for example phosphorous acid. In addition to the acids, primary, secondary and tertiary salts, for example the alkali metal salts, may also be used.

Suitable oxygen-containing acids of sulfur are especially sulfuric acid and disulfuric acid, peroxy sulfuric acid and acids in which sulfur has a formal valency of less than 6, for example sulfurous acid. In addition to the acids, primary and secondary salts, for example the alkali metals salts, may also be used.

The catalysts may, however, also be prepared from compounds containing two or more of the four catalytically effective components. Exemplary thereof are di-ammonium hexachlorotellurate, ammonium molybdate, phosphorotungstic acid, phosphorovanadic acid, basic tellurium-IV phosphate, and di-ammonium-tellurium molybdate.

It is advantageous to mix common aqueous, if desired acid or alkaline, solutions of suitable compounds with the carrier material and, if desired, to evaporate the mixtures to dryness. It is, however, also possible to apply the compounds to the carrier material one after the other. In some cases, especially when fluid bed catalysts are used, the catalyst may be prepared by dry mixing the carrier material with the compounds that may be in a pulverized state.

In many cases, the composition of freshly prepared catalysts changes during the course of the reaction; especially after a certain starting period, part of tellurium contained in the catalyst is present in an elementary form whereas the ammonium salts are, in many cases, converted, wholly or partially, into the chlorides.

It is expedient to use a catalyst/carrier system containing a total weight of tellurium within the range of from 0.5 to 30 percent, preferably from 1 to 20 percent. The ratio of the ammonium nitrogen atoms in the catalyst to the free or bound tellurium atoms is advantageously within the range of from 0.05 to 20. preferably from 0.1 to 10. Also, the ratio of the vanadium and/or molybdenum and/or tungsten atoms in the catalyst to the free or bound tellurium atoms advantageously ranges from 0.05 to 20, preferably from 0.1 to 5. In contradistinction thereto, the ratio of phosphorus and/or sulfur atoms in the catalyst to the free or bound tellurium atoms is advantageous within the range of from 0.5 to 30, preferably from 1 to 20. However, the reaction also proceeds beyond these ranges.

According to the reaction of the invention, the starting compounds which are advantageously in admixture with one another, are generally passed over the solid catalyst. The catalyst may be a fixed bed catalyst, but it may also be in a fluid bed, moving bed or in a fluidized bed reactor. Catalyst suspensions may also be used.

The starting substances may also be used in admixture with gases which are inert under the reaction conditions, for example methane, ethane, propane, isobutane, nitrogen, argon, carbon dioxide, hydrogen and the like. Especially, the oxygen used may be air and the hydrogen chloride required may be in the form of vapors of aqueous hydrochloric acid.

In detail, it is advantages to pass a gas mixture containing the reaction components, through a tube filled with a catalyst, to condense the gas mixture at the end of the reaction zone, to separate any unreacted or formed monochloroparaffin from the condensate and then to recycle this monochloroparaffin, wholly or partially, into the reaction zone together with the uncondensed portion of the reaction gas. The gas mixture is advantageously cooled at the end of the reaction zone to a temperature above the boiling point of the monochloroparaffin, but below the boiling point of allyl chloride or methallyl chloride. By carrying out this partial condensation, the expense of condensation and revaporization of any unreacted or formed monochloroparaffin to be recycled into the reaction zone is saved.

It is advantages but not essential to select such a pressure and a temperature that the monochloroparaffin is present in the gaseous state. The reaction products are worked up in usual manner. After leaving the reaction zone the reaction mixture is advantageously cooled, whereby the allyl chloride or the methallyl chloride and any unreacted or newly formed monochloroparaffin are condensed. The condensate is preferably separated by distillation. In some cases, as has already been mentioned above, a partial condensation may be carried out, whereby the allyl chloride or the methallyl chloride is separated from the monochloroparaffin. The monochloroparaffin is recycled into the reaction zone. It depends on the explosion limits in the gas mixtures containing oxygen prior to, during or after the reaction, whether olefin, hydrogen chloride and oxygen or monochloroparaffin and oxygen can be used at a stoichiometric ratio. In general, oxygen is used in a deficiency.

The molar proportion of monochloroparaffin to oxygen or olefin to oxygen or the sum of monochloroparaffin and olefin to oxygen is advantageous within the range of from 20 to 1, preferably 10 to 1. The molar proportion of olefin to hydrogen chloride advantageously ranges from 10 to 1, preferably from 5 to 1. It is, however, also possible to operate beyond these ranges. In general, the reaction is not quantitative. After separation of the reaction products, the unreacted starting compounds are, therefore, recycled into the reactor.

The temperatures and pressures at which the process is carried out, are not critical. In order to obtain high conversion rates, it is, however, advantageous to operate at high temperatures and pressures. Too high a temperature, however, favors the formation of undesired oxidation products. It is, therefore, preferable to operate at temperature in the range of from 20° to 350° C., preferably from 100° to 350° C. and under pressures in the range of from 0.2 to 20 atmospheres gage, preferably from 1 to 10 atmospheres gage. However, the reaction also proceeds beyond these ranges. Pressures exceeding 20 atmospheres may, for example, be applied when the gaseous starting products are mixed with the above-mentioned gages which are inert under the reaction conditions.

The following Examples serve to illustrate the invention, but they are intended to limit it thereto.

Example 1

500 Milliliters of $SiO_2$ shaped as a cylinder of 3 millimeters in diameter, were impregnated with a solution of 10 grams of Te as an orthophosphate, 10 grams of vanadium as $V_2O_5$ and 50 grams of diethanolamine in water and then evaporated to dryness. Subsequently, the catalyst was impregnated with a solution of 50 grams of $H_3PO_4$ in a little amount of water and once more evaporated to dryness. The dried catalyst placed in a vertical steel tube having a diameter of 32 millimeters and a length of 700 millimeters, was charged under normal pressure with a gas mixture consisting of 25 liters S.T.P. per hour of propylene, 9 liters S.T.P. per hour of $O_2$ and 9 liters S.T.P. per hour of HCl. The temperature in the tube was maintained within the range of from 220° to 225° C. by means of an oil jacket heating. After leaving the reaction tube the gas mixture was liberated from reaction water by cooling it to 20° C. and then it was passed through a cooling trap (−70° C.). In this trap, allyl chloride as well as isopropyl chloride, propylene and small amounts of higher chlorinated byproducts were condensed. The reaction proceeded for 660 hours and provided a practically constant space-time yield of 38 grams/liter. hr. The increase in weight of the catalyst, due to deposits of cracking products, was 0.5 gram per 100 grams of allyl chloride produced.

Comparative Example

500 Milliliters of $SiO_2$ shaped as a cylinder of 3 millimeters in diameter, were impregnated with a solution of 20 grams of Te as an orthophosphate and 50 grams of diethanolamine in water and then evaporated to dryness. The dried catalyst was placed in the tube described in Example 1 and the reaction was carried out under the same conditions as described in Example 1. The reaction proceeded for 165 hours and provided an average space-time yield of 39 grams/liter.hr. The increase in weight of the catalyst, due to deposits of cracking products, was 4 grams per 100 grams of allyl chloride produced.

What we claim is:

1. In a process for the manufacture of an alkenyl chloride of the formula $$CH_2=C-CH_2Cl$$
$$\phantom{CH_2=C-}|$$
$$\phantom{CH_2=C-}X$$

in which X is hydrogen or methyl, by the reaction of oxygen with (a) an olefin of the formula

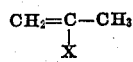

in which X has the meaning mentioned above and hydrogen chloride or (b) a monochloroparaffin of the formula

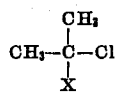

in which X has the meaning mentioned above or (c) a mixture of said olefin, hydrogen chloride, and a monochloroparaffin having the same number of carbon atoms as said alkenyl chloride, in the presence of a tellurium catalyst containing a member selected from the group consisting of tellurium, a tellurium compound and mixtures thereof at a temperature from 20° to 350° C. and pressure from 0.2 to 20 atmospheres, the improvement of which comprises reacting (a), (b), or (c) in presence of the tellurium catalyst to which has been added:

I A. a mono-, di, tri- or tetra-alkyl ammonium salts having an alkyl substituent selected from the group consisting of methyl-, di- methyl-, trimethyl-, tetramethyl-, tri-isopropyl-, methyl- ethyl-, stearyl-, or methyl-butyl-dodecyl;

B. an aryl-ammonium salt selected from the group consisting of anilinium salt; a mono-, di- and trialkyl-monoaryl ammonium salt;

C. an ammonium salt of aza-cycloaliphatic compound selected from the group consisting of pyrrolidinium, and piperidinium, and N-mono- and N,N-dialkyl derivatives thereof; and salts of bis-1.5-pentamethylene;

D. a heterocyclic nitrogen compound selected from the group consisting of a pyridinium-, quinolinium-, isoquinolinium salt and the alkyl derivatives thereof;

E. an alkylene-diammonium salt selected from the group consisting of an ethylene-diammonium-, hexamethylene-diammonium-, and phenylene-diammonium salt; or F. a mono-, di- and trialkanol-ammonium salt; and wherein the salt above is a chloride salt; or a salt formed from an acid of an empirical formula $H_nX_mO_p$ in which $n$ is an integer of from 1 to 4, $m$ is an integer of from 1 to 4, $p$ may be zero or an integer from 1 to 8, and X represents F, Cl, Br, I, S, Se, N, P or c, in an atomic ratio of nitrogen to tellurium from 0.05 to 20;

II-at least one compound selected from the group consisting of vanadium pentoxide; vanadium-IV oxychloride; vanadium-IV oxysulfate; vanadium-II oxide, vanadium-II chloride; vanadium-II sulfate; vanadium-III oxide; vanadium-III chloride; vanadium-III sulfate; vanadium-IV oxide, vanadium-IV sulfate; vanadium-V oxychloride; peroxy compounds of pentavalent vanadium, vanadium sulfides, sulfato-, sulfito- and oxalato-vanadates of tri-, and pentavalent vanadium; vanadic acids and the salts thereof; and heteropoly acids containing vanadium and salts thereof, in an atomic ratio of vanadium to tellurium from 0.05 to 20;

III at least one compound selected from the group consisting of orthophosphoric acid, pyrophosphoric acid, peroxyphosphoric acid, phosphorous acid; sulfuric acid, disulfuric acid, peroxy sulfuric acid, sulfurous acid, and alkali metal salts of said acids in an atomic ratio of phosphorous or sulfur to tellurium from 0.5 to 30.

2. The process as claimed in claim 1, wherein the catalyst contains nitrogen atoms bound in the nitrogen compound and tellurium atoms in a ratio of from 0.1 to 10.

3. The process as claimed in claim 1, wherein the atomic ratio between vanadium and tellurium is in the range of from 0.1 to 5.

4. The process as claimed in claim 1, wherein the atomic ratio between phosphorous and tellurium is in the range of from 1 to 20.

5. The process as claimed in claim 1, wherein the catalyst contains 0.5–30 percent by weight of tellurium.

6. The process as claimed in claim 5, wherein the catalyst contains from 1 to 20 percent by weight of tellurium.

7. The process as claimed in claim 1, wherein the monochloroparaffin is isopropyl chloride.

8. The process as claimed in claim 1, wherein the monochloroparaffin is tert.butyl chloride.

9. The process as claimed in claim 1, wherein the catalyst is supported on a carrier material.

10. The process as defined in claim 1, wherein the tellurium catalyst is tellurium metal, a tellurium chloride, a tellurium oxide, telluric acid, a tellurium oxychloride, hydrogen telluride, tellurous acid, metatelluric acid, a tellurite, a tellurate, a metatellurite, a hexachloro tellurite, tellurium oxysulfate, basic tellurium ortho phosphate, alkyl telluride, a dialkyl telluride, an alkyl-tellurium trichloride, or a dialkyl tellurium dichloride.